UNITED STATES PATENT OFFICE.

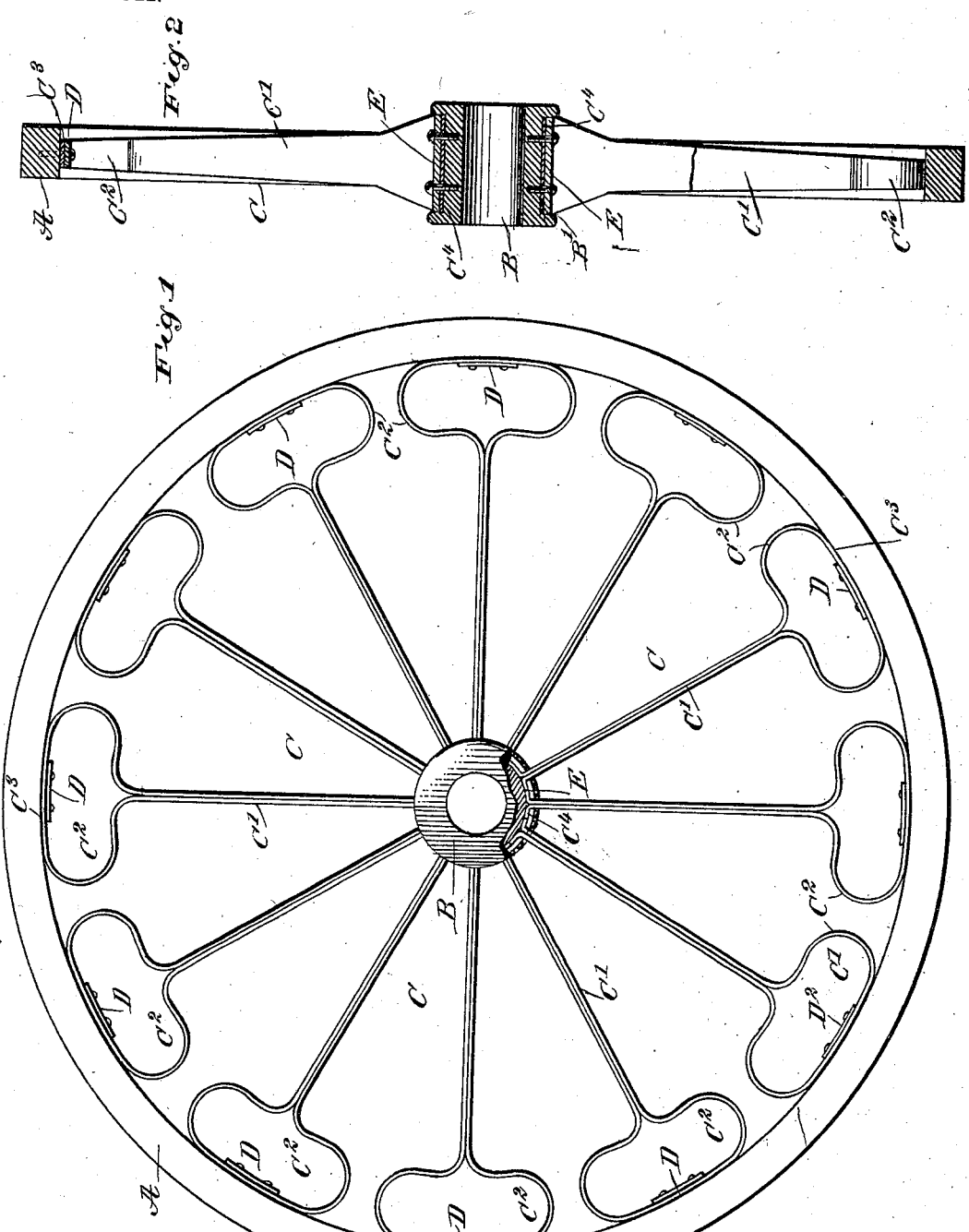

MATHEW J. CLARK, OF CHAPARAL, ARIZONA TERRITORY.

VEHICLE-WHEEL.

SPECIFICATION forming part of Letters Patent No. 725,410, dated April 14, 1903.

Application filed December 19, 1902. Serial No. 135,837. (No model.)

*To all whom it may concern:*

Be it known that I, MATHEW J. CLARK, a citizen of the United States, and a resident of Chaparal, in the county of Yavapai and Territory of Arizona, have invented a new and Improved Vehicle-Wheel, of which the following is a full, clear, and exact description.

The invention relates to vehicle-wheels having spring-spokes to give the desired resiliency to the wheels and to the vehicle.

The object of the invention is to provide a new and improved vehicle-wheel which is simple and durable in construction and arranged to insure easy and comfortable riding, especially when traveling over rough roads.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement, part of the hub being shown in section. Fig. 2 is a transverse section of the same, and Fig. 3 is an enlarged sectional side elevation of the connection between the hub and the inner ends of the spokes.

The vehicle-wheel consists, essentially, of a rim A, a hub B, and spokes C, connecting the rim with the hub, and each of the said spokes C is made from a single piece of flat spring metal doubled up in a portion of its length to form a doubled-up shank $C'$, and the outer ends of the doubled-up portions of the shank terminate in a loop $C^2$, having its middle portion $C^3$ in segmental shape to fit the inside of the rim A, as plainly indicated in Fig. 1. Clip-plates D serve to fasten the middle portions $C^3$ of the loops $C^2$ to the rim A, it being understood that screws, nails, or other similar fastening devices are employed, extending through the plates and the middle portions $C^3$ of the loops, to engage the material of the rim A, as indicated in the upper portion of Fig. 2.

The inner ends of the doubled-up portions of the shanks $C'$ terminate in angular lugs or flanges $C^4$, extending in opposite directions and abutting against the hub B within the annular groove $B'$ thereof, and the lugs of adjacent spokes are engaged by a clip-plate E, fastened by screws, nails, or other fastening devices to the hub B. The ends of the lugs $C^4$ of adjacent spokes abut against each other, as plainly indicated in Figs. 1 and 3, and as the lugs are of a width to abut against the flanges formed at the ends of the hub B it is evident that the spokes are held against movement in any direction on the hub B. By this construction a very strong and durable connection between the spokes and the hub is established, and at the same time a yielding connection is had between the spokes and the rim owing to the loop $C^2$ yieldingly connecting the shanks of the spokes with the rim.

The spokes are preferably made tapering, as indicated in Fig. 2, to give the desired lightness to the spokes without decreasing their efficiency and strength.

Now it will be seen that when the vehicle travels over a rough road the spokes readily take up all jarring and jolting motion, so that an easy and comfortable riding is insured, and at the same time strong and durable wheels are provided, not liable to break or get out of order.

Having thus described my invention, I claim as new and desire to secure by Letters Patent—

1. A vehicle-wheel having a rim, a hub, and spokes connecting the hub with the rim, each spoke being formed from a piece of spring metal partly doubled up to form the spoke-shanks, the doubled-up portions of the shanks terminating at their outer ends in loops, for attachment to the said rim, and the inner ends of the said doubled-up portions terminating in angular lugs, for attachment to the hub, said spoke-shanks being parallel with each other and extending side by side from the loops to the angular lugs and being sharply broadened at their inner ends to give greater strength and to abut against the flanges of the hub to prevent lateral movement thereon, as set forth.

2. A vehicle-wheel having a rim, a hub provided with a peripheral groove and flanges at the ends, and spokes connecting the hub with the rim, each spoke being formed of a piece of spring metal partly doubled up into parallel straight sections extending from the hub throughout the greater part of the length of the spoke, and bent into side-by-side contact with each other to form the spoke-shank, the doubled-up portions terminating at their outer ends near the rim of the wheel in loops, for attachment to the rim, and at their inner ends in angular lugs, fitting into the said groove of the hub and secured therein, as set forth.

3. A vehicle-wheel having a rim, a hub provided with a peripheral groove and flanges at the ends, and spokes connecting the hub with the rim, each spoke being formed of a piece of spring metal partly doubled up, to form the spoke-shank, the doubled-up portions terminating at their outer ends in loops, for attachment to the rim, and at their inner ends in angular lugs, fitting into the said groove of the hub and secured thereto, the lugs of adjacent spokes abutting against each other, as set forth.

4. A spoke for a vehicle-wheel, formed of a single piece of spring metal, doubled up in part of its length to form the shank, the doubled-up portions terminating at their outer ends in loops and at the inner ends in angular lugs, said spokes tapering from their inner ends to their looped ends, as set forth.

5. A spoke for a vehicle-wheel, formed of a single piece of spring metal, doubled up in part of its length into parallel straight sections to form the shank, the doubled-up portions terminating at their outer ends in loops, and at the inner ends in angular lugs, the lugs standing in opposite directions, and the straight sections being in side-by-side contact with each other and sharply broadened at their inner ends, as set forth.

In testimony whereof I have signed my name to this specification in the presence of two subscribing witnesses.

MATHEW J. CLARK.

Witnesses:
THOMAS McNOLON,
J. W. HUBBARD.